United States Patent [19]
Pollman

[11] Patent Number: 5,542,732
[45] Date of Patent: Aug. 6, 1996

[54] COMBINED SUPPLEMENTAL SHADING AND CARRIER APPARATUS FOR A CANOPIED STROLLER

[76] Inventor: Beverly E. Pollman, 8422 Brixton St., San Antonio, Tex. 78250

[21] Appl. No.: 329,298

[22] Filed: Oct. 26, 1994

[51] Int. Cl.⁶ ........................................................ B60J 9/00
[52] U.S. Cl. .................................. 296/77.1; 297/184.13
[58] Field of Search ................................ 296/77.1, 136; 297/184.13; 150/166; 280/47.38

[56] References Cited

U.S. PATENT DOCUMENTS

| | | |
|---|---|---|
| D. 319,202 | 8/1991 | Reinhart . |
| 1,732,878 | 10/1929 | Collender . |
| 3,834,756 | 9/1974 | Grell . |
| 4,533,170 | 8/1985 | Banks et al. . |
| 4,582,355 | 4/1986 | Hall ........................................ 296/77.1 |
| 4,810,030 | 3/1989 | Lewis . |
| 4,846,521 | 7/1989 | Takahashi et al. ..................... 296/77.1 |
| 5,074,616 | 12/1991 | Smith . |
| 5,184,865 | 2/1993 | Mohtasham et al. . |

OTHER PUBLICATIONS

The Right Start Catalog Super Summer (no date).
The Right Start Catalog Late Winter (1994).
The Right Start Catalog Winter (1994).
Perfectly Safe: The Catalog for Parents Who Care (no date).

Primary Examiner—Joseph D. Pape
Attorney, Agent, or Firm—Gunn, Lee & Miller, PC

[57] ABSTRACT

A combined supplemental shading and carrier apparatus for a canopied stroller. A fabric shade panel is arranged for attachment overlapping and underlying the stroller frame. The apparatus is retained in proper alignment by connecting the upper end shading panel and the lower end of the body panel to a center mounted child restraint member. The apparatus further has a carrier or pocket positioned at the rear of the stroller adapted to be easily accessible to the user of the stroller. A number of complementary fasteners are affixed to the shading panel and the body panel such that when engaged the fasteners retain the shading panel in either open or closed conditions. The shade panel is composed of ultraviolet radiation screening material, yet provides for a flow or ventilation within the carrier area of the stroller.

11 Claims, 5 Drawing Sheets

COMBINED SUPPLEMENTAL SHADING AND CARRIER APPARATUS FOR A CANOPIED STROLLER

BACKGROUND OF THE INVENTION

This invention relates to a shade for use with a child's stroller and more particularly a supplemental shade and carrier apparatus for a canopied child's stroller.

A number of covers for strollers or baby carriages have been developed to protect the child being transported. Protecting covers as shown in U.S. Pat. Nos. 1,732,878 and 5,184,865, have been used to protect the baby from insects, bugs, mosquitos and the like. U.S. Pat. No. 3,834,756 discloses a raincover for a stroller with a canopy wherein the raincover downwardly extends around all sides of the stroller in skirt-like fashion. Design U.S. Pat. No. Des. 319,202 shows a similar skirt-like stroller cover. A self-supporting frame with a flexible cover sheet is disclosed in U.S. Pat. No. 4,533,170. A shade for use with infant car seats is taught in U.S. Pat. No. 4,810,030. U.S. Pat. No. 5,074,616 discloses a weather shield for an infant seat having a carrying handle.

U.S. Pat. No. 4,533,170 shows a cover which, upon detachment from the stroller, resiles to a straight configuration to form a bundle of elements. The bundle of rods may be coiled for storage in a small pouch or case together with the folded plastic cover. However, the rod sections of U.S. Pat. No. 4,533,170 remain rigid and thereby require a given space to be used during storage of the structure.

None of the cited patents teach or disclose securing the shade or cover to a forward child restraining bar, thereby improving the safety restraint feature of the stroller while still providing adequate shading. By having the shade and carrier apparatus of the present invention attached at the top of the shading panel and at the bottom of the body section to the forward child restraining member, the apparatus wraps around the entire child carrier section.

The present invention utilizes no rigid structural members and may thereby be folded into a very compact, soft configuration for easy transportability and storage. The invention may also be used when a stroller has a reclining function because the flexibility of the fabric body easily conforms to a stroller in a recline position.

Further, the present invention provides adequate shading and protection of a child in the stroller while not having a lengthy, loose skirt extending downwardly close to the wheels of the stroller. The fabric shading section of the present invention does not extend below the seat portion of the carrier section of the stroller thereby eliminating any possible entanglement with the wheels of the stroller.

Further yet, the present invention provides a convenient, closeable pocket accessible from the rear side of the stroller when the shade is in use.

SUMMARY OF THE INVENTION

The present invention provides a shade for the conventional canopied child's stroller and also for the foldable, umbrella-type canopied stroller. A flexible fabric body section has an elastic strap or equivalent releasable means for attaching the body section at its lower end to a child restraint member attached to the frame of the stroller. The restraint member is generally a vertically positioned member centrally located along the front edge of the seat of the child carrier. Typically, the vertical member also divides the seat so that the child's right thigh is disposed to the right side of the restraint member and the left thigh is disposed to the left of the restraint member.

A fabric shading panel is attached at the upper end of the body section and extends along an upper length of the body section. The shading panel has an elastic strap or equivalent releasable means for attaching the shading panel at its uppermost end to the child restraint member attached to the frame of the stroller.

When the apparatus is attached to the stroller by the two straps engaged with the restraint member, an inner surface of the upper end of the body section is adapted to overlay the stroller's canopy. The inner surface of the lower end of the body section is adapted to underlay the child carrier section of the stroller.

BRIEF DESCRIPTION OF THE DRAWINGS

For a fuller understanding of the nature of the present invention, reference should be had to the following detailed description taken in connection with the accompanying drawings. The accompanying drawings show, for the purpose of exemplification without limiting the invention or the claims to the invention, certain practical embodiments illustrating the principles of this invention wherein:

DETAILED DESCRIPTION OF THE PREFERRED EMBODIMENT

Figure 4:
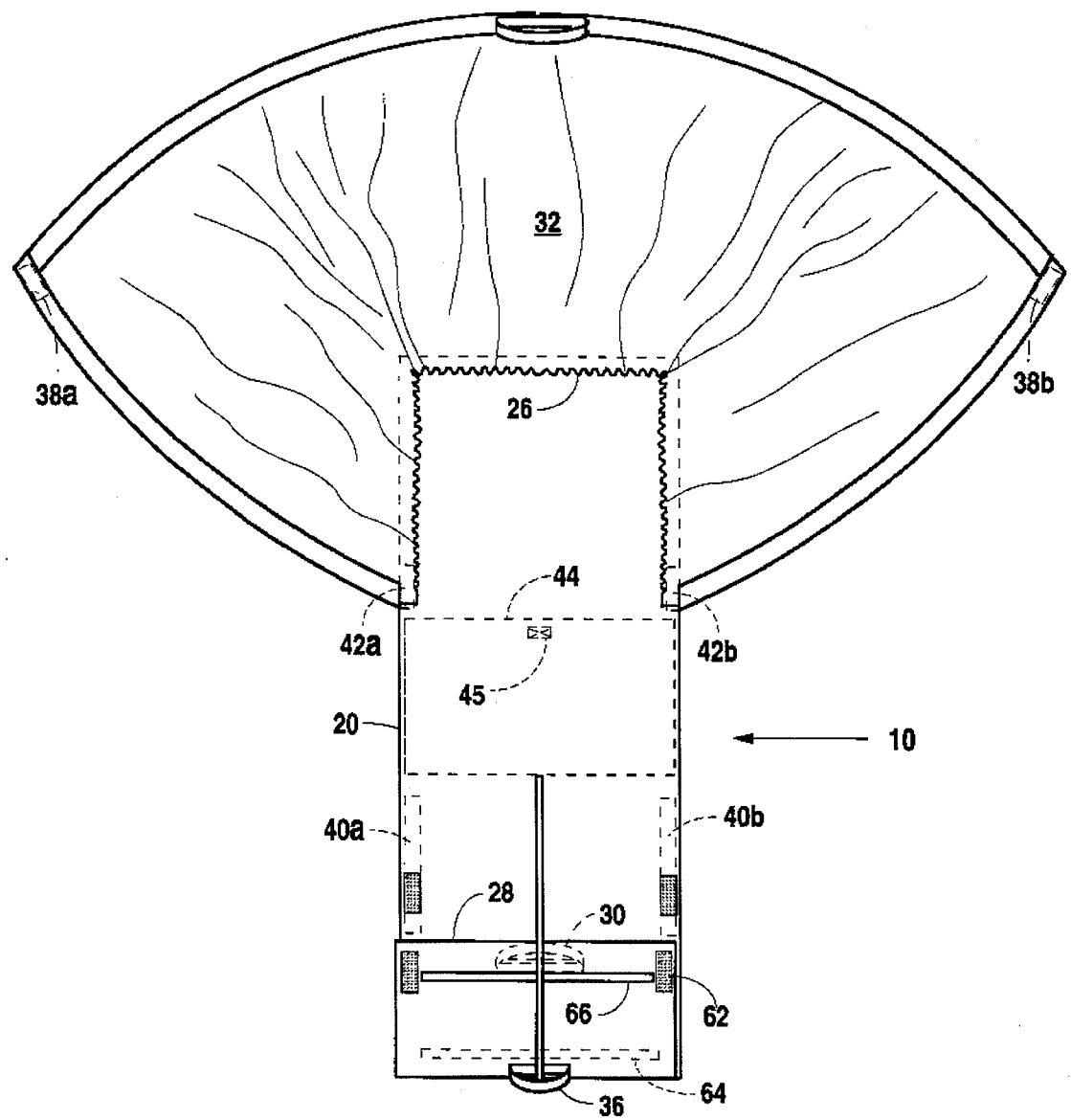
FIG. 4 is a plan view showing the inner surface of the present invention with the second end of the fabric body folded to position an alternative attachment loop for releasable attachment to the stroller's restraint member.
Figure 5:
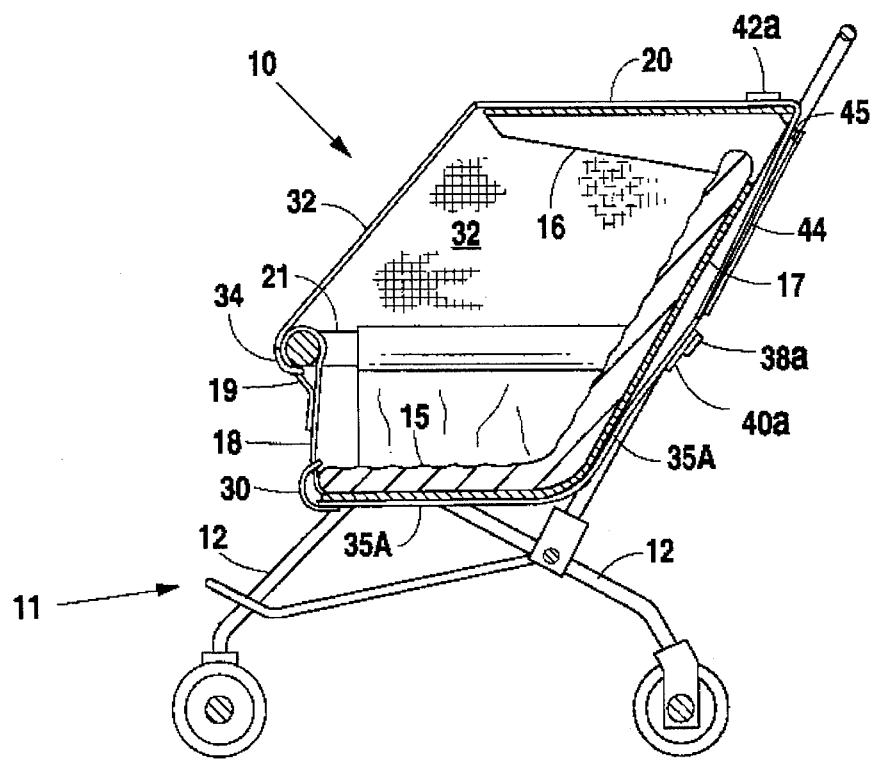
FIG. 5 is a cross-sectional, side elevation view of the present invention attached at the restraint member of a conventional child's stroller with one side of the shading panel in the open condition.
Figure 6:
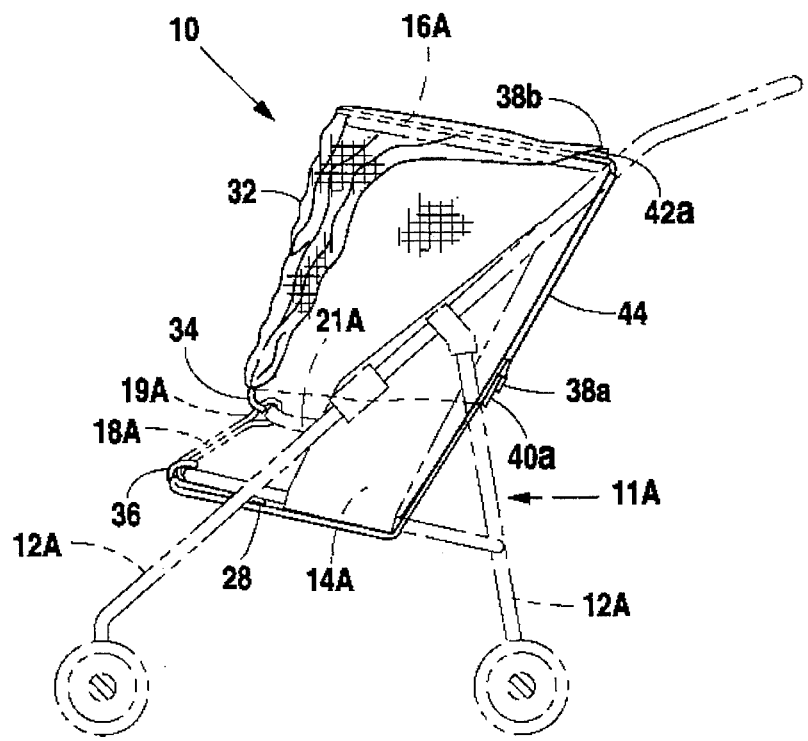
FIG. 6 is a side elevation view of the present invention attached at the restraint member of a foldable umbrella stroller with one side of the shading panel in the open condition.

As shown in FIGS. 1–6, the present invention is directed towards a foldable, combined supplemental shading and carrier apparatus for a canopied stroller. Referring to the drawings more particularly by reference character, reference numeral 10 indicates the combined supplemental shading and carrier apparatus designed and adapted for use in connection with a conventional child's stroller 11 (FIGS. 1 and 5) or a foldable umbrella stroller 11A (FIG. 6).

Figure 1:
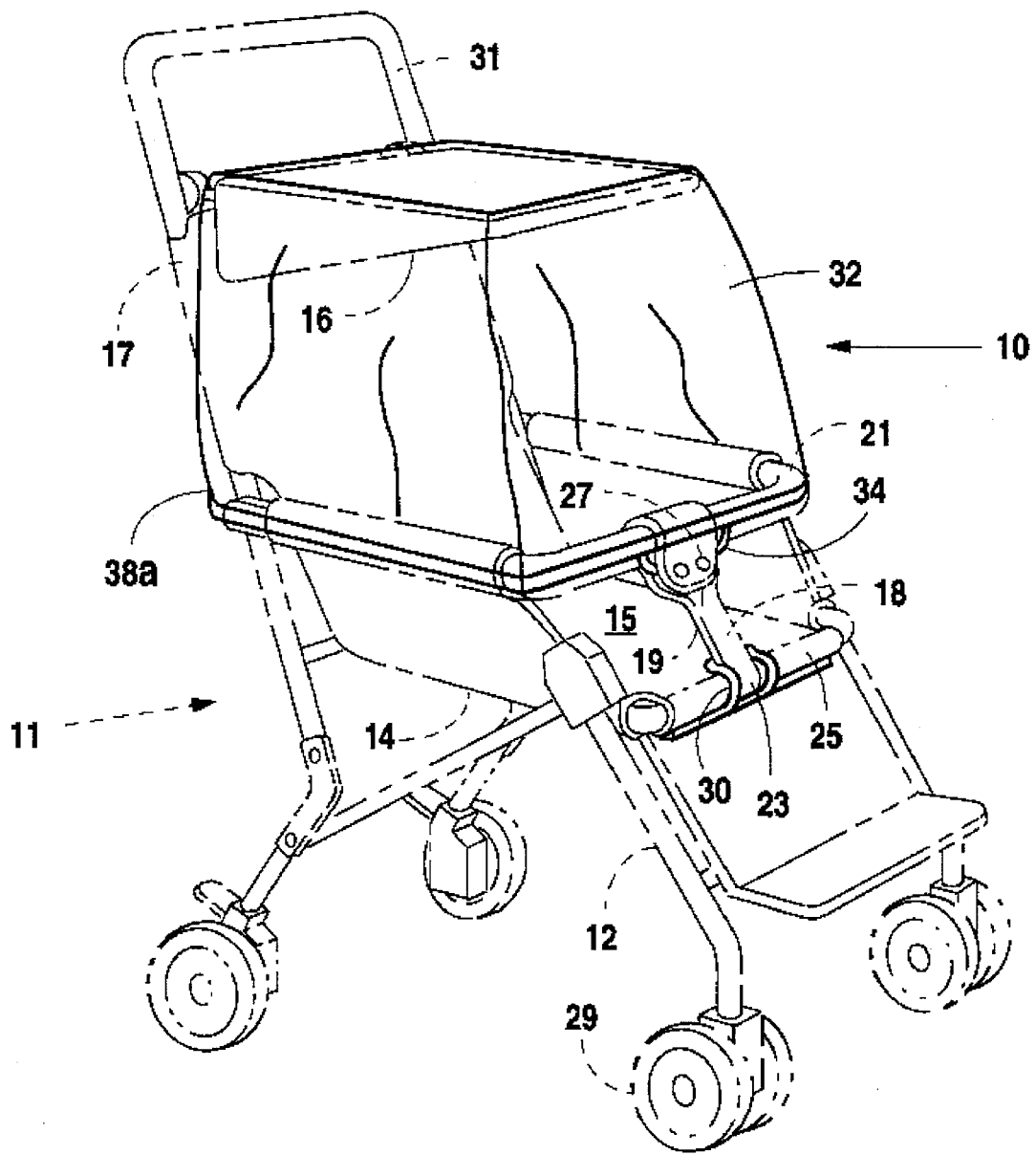
FIG. 1 is a front, right side perspective view of a child's stroller fitted with the shade and carrier pocket of the present invention.

FIG. 1 illustrates the conventional child's stroller having a support frame 12, a child carrier section 14 including a seat portion 15 and back support portion 17, an overhanging canopy member 16, and a child restraint member 18. In FIG. 1, the child restraint member 18 is releasably attached at a first end 19 to a horizontal support bar 21 which retains a child inside the stroller on the seat portion 15 of the carrier section 14. The first end of the restraint member may be attached to or released from the bar 21 by means of snaps 27 or other well-known releasable fasteners. A second end 23 of the restraint member is attached to the forward edge 25 of the seat portion 15.

The restraint member 18 is intended to extend generally vertically between the child's thighs to prevent a child from slipping out of the carrier section 14 if the child slides forward on seat portion 15 while being transported in the stroller 12.

Frame 12 further supports and maintains alignment of the stroller wheels 29, the child carrier section 14, and the operator handle 31. The stroller 11 is provided with appropriate cushions and padding to protect the child occupant. Some variations of strollers allow for reclining the child carrier section 14 to form a bed-like configuration. Generally, the back portion of carrier section 14 may be pivoted at the intersection of the back and seat from a vertical to a generally horizontal position.

The stroller 11 is of entirely conventional design and further detailed description thereof is not necessary to an understanding of the present invention.

Figure 2:
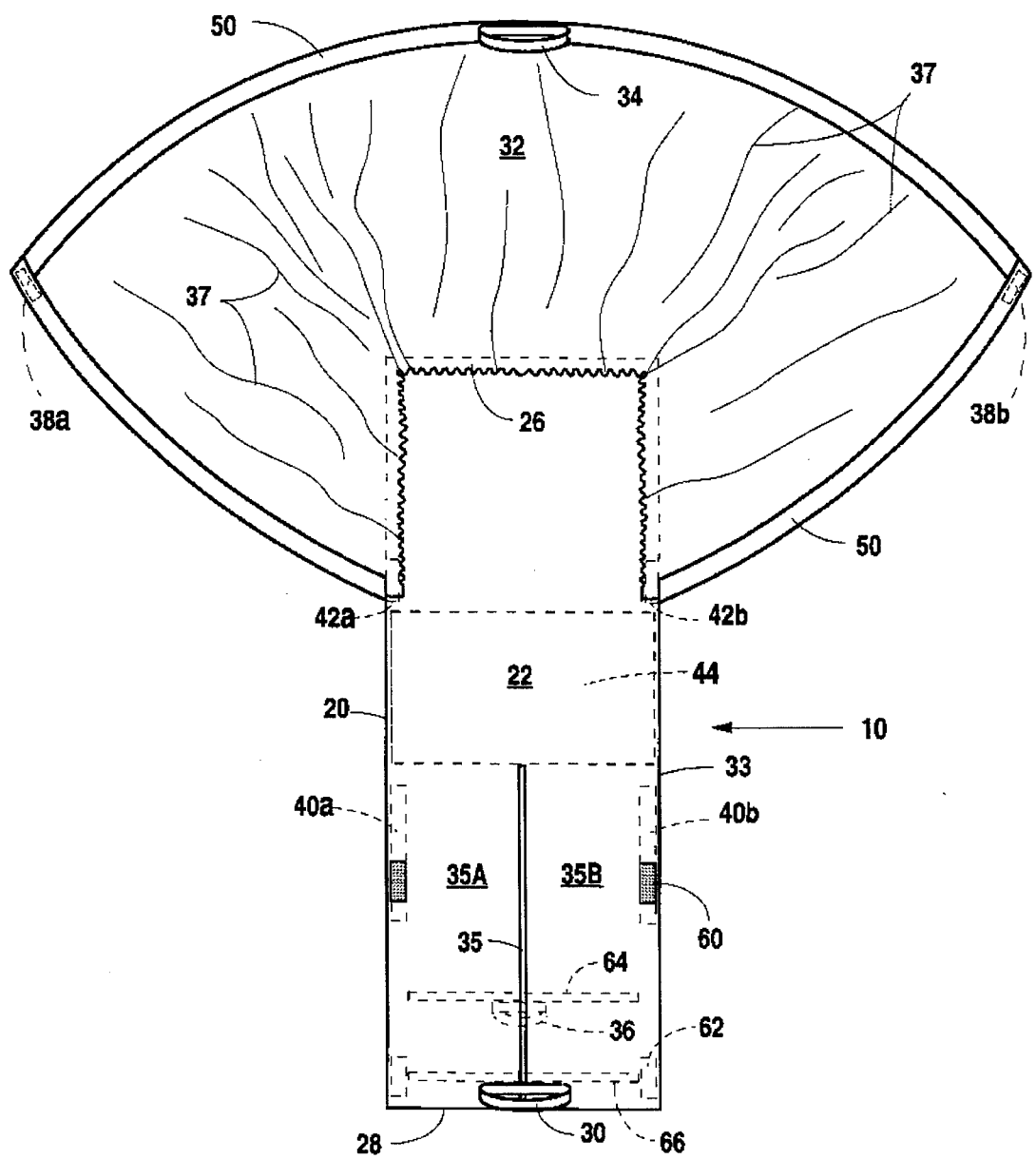
FIG. 2 is a plan view showing the inner surface of the present invention.

FIG. 2 illustrates the present invention in a plan view. To understand FIG. 2, the shade 10 is outstretched on a flat surface with the inner surface 22 exposed. Shade 10 has a first, generally rectangularly shaped, flexible fabric body section 20. The body section 20 has a first upper end 26 and an opposite second lower end 28. Body section 20 is approximately 4 ½'-5' in length and approximately 12"-18" wide.

From a generally mid-section 33 to the second end 28, the body section 20 has a split 35 dividing the lower end of the body section 20 into a right body panel 35A and a left body panel 35B. An elastic strap or loop 30 is attached at the lower end 28 of body 20 for releasable attachment to the restraint member 18 of the stroller 11 as will be discussed below.

Attached along the upper end 26 of body section 20 is a fabric shading panel 32. Shading panel 32 is composed of a fabric material which allows only a portion of the ambient ultraviolet radiation to pass through the fabric. Small screen-like openings over the entire panel also allow for air ventilation. New fabrics, well-known in the art, may be used which not only allow for air flow, but resist penetration by rain. The panel 32 is formed from a piece of fabric material approximately 1 ½'-2' wide and 4 ½'-5 ½' long.

In the present invention shade panel 32 incorporates a double layer of fabric material to ensure that 50%–75% of the ambient ultraviolet radiation is blocked from passing through the fabric to the inside of the stroller, while still affording adequate air flow or ventilation through the shade panel 32.

As may be seen in FIG. 2, shade panel 32 extends an upper length along the right and left sides of the upper end 26 of body section 20 and is sewn or otherwise affixed to body section 20. A reinforcing band 50 extends around the outer perimeter of panel 32. Because of the arcuate shape of panel 32, gathers 37 are shown in FIGS. 2–4.

A second elastic strap or loop 34 is attached to the reinforcing band 50 at the uppermost end of the shade panel 32. Strap 34 is provided for releasable attachment to the first end 19 of the child restraint member 18 of the stroller 11 as will be discussed below.

Also to be noted in FIG. 2 are complementary hook 60 and loop 62 fastener sections. When the present invention is folded or rolled into its compact, soft storage position, hook 60 and loop 62 fastener sections engage to retain the present invention in the folded position.

Figure 3:
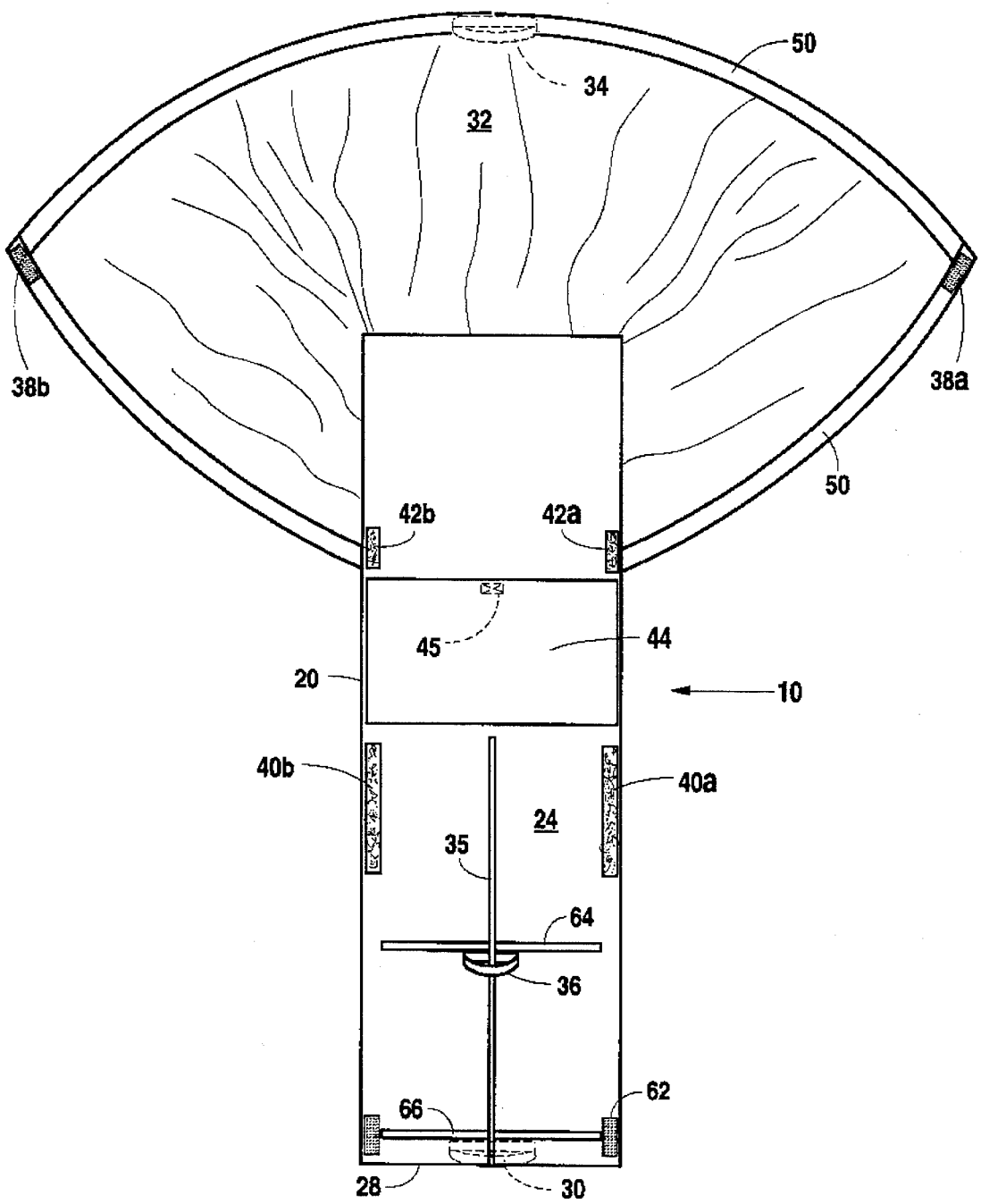
FIG. 3 is a plan view showing the outer surface of the present invention.

Turning to FIG. 3, the combined supplemental shading and carrier apparatus 10 is illustrated in a plan view with the outer surface 24 exposed. Extending transversely across the lower end section 28 of the body section 20 are two stiffeners 64 and 66. These stiffeners assist in allowing the lower end section 28 to conform to the shape of the underside of the child carrier seat section 15 when the device 10 is attached to the stroller. Further, the stiffeners 64 and 66 keep the device 10 in a more tubual configuration when the shade is rolled up for storage. Stiffeners 64 and 66 may be made of suitable, flexible plastic strips which retain their shape after exposure to moisture, whether in washing or when exposed to rain.

A third elastic strap or loop 36 is attached to the outer surface 24 of the lower end of the body section 20. This third strap 36 is provided for releasable attachment to the restraint member 18 when the stroller is the foldable umbrella type 11A shown in FIG. 6, or whenever the seat portion 15 of the carrier 14 is shorter in length than found in the conventional child stroller 11. Attachment of strap 36 to restraint member 18 will be discussed below.

Closable storage carrier 44 is attached to the outer surface 24 of the body section 20, such that it is accessible at the rear of the stroller when the operator is pushing. A simple pocket is formed with a closure 45 to enable the user to carry items such as diapers, bottles, juice boxes, crackers and other items. The pocket 44 is adapted to safely support from 3–5 pounds of material without causing the stroller to tip backward when the stroller is empty.

Fabric fasteners (loop sections) 40a and 40b are attached to the left and right sides of body 20 on the outer edges of the divided panels 35A and 35B. These fasteners 40a and 40b, cooperate with complementary fabric fasteners (hook portions) 38 and 38b attached on the corners of the outer edge of reinforcement band 50 of the shade panel 32 to hold the panel 32 in the fully closed position about the carrier section 14 when the device 10 is affixed to the stroller 11. FIG. 1 illustrates the device 10 in its fully closed condition. In FIG. 1, hook portion fastener 38a is engaged with loop portion fastener 40a (not shown) which is positioned at the rear or back of the stroller 11. On the opposite side of the stroller 11, hook portion fastener 38b is engaged with the loop portion fastener 40b to close the left side of the stroller at the child carrier area.

FIG. 4 illustrates a plan view of the device 10 similar to that illustrated in FIG. 1; however, the lower end 28 of the body section 20 has been folded over to overlap a portion of the body section. By folding the lower end 28 as shown in FIG. 4, elastic strap 36 is positioned for engagement with the child restraint member 18 (see FIG. 6) when the device 10 is attached to a different type of canopied stroller. Folding the lower end 28 places the excess fabric of the body section securely against the underside of the stroller seat between the body section 20 extended beneath the stroller seat and the underside of the carrier section 14 as seen in FIG. 6.

FIG. 5 is a cross-sectional, side elevation view which illustrates the combined supplemental shade and carrier apparatus attached to or draped around conventional canopied child's stroller 11. As may be seen in FIG. 5, elastic straps 30 and 34 are looped around child restraint member 18 at the front of the stroller 11. The fabric shading panel 32 extends from a location generally in the same horizontal plane as the lower end of the child restraint member 18 and above stroller seat 15, wraps around to the back of the stroller 11 and attaches with fasteners 38a and 40a cooperating to hold the shading panel in a closed position. It should also be noted that the shading panel does not extend below the seat 15 so as to avoid any possible interference with the wheels of the stroller. Further, it should be noted that the entire child carrier section 14 is wrapped by the device 10. This ensures that the shade does not shift when the wind velocity increases. The shade panel is thereby retained in a generally fixed configuration. Because the shade panel 32 is attached to the restraint member 18, it is more difficult for a child to crawl out of the carrier section 14.

The upper edge 26 of body section 20 is aligned with the forward edge of the canopy 16 of the stroller 11, then extends rearwardly along the canopy, and then drops along the rear of the stroller. FIG. 5 shows that the carrier pocket 44 is thusly aligned at the rear of the stroller near the operator handle 31 for easy access by the user. The lower portion of the body which is divided into right and left body panels 35A and 35B extends from the back 17 of the carrier section 14, beneath the seat section 15 and eventually to the front edge of the seat 15. Strap 30 is attached around the restraint member 30 to secure the combined supplemental shade and carrier apparatus 10 to the stroller 11.

To attach the apparatus 10 to the stroller, the fabric shading panel 32 is draped over the front and sides of the stroller 11 with the upper edge 26 of the fabric body section 20 aligned with the forward edge of the canopy 16. Strap 34 should be aligned with the restraint member 18 but not yet attached. The remainder of the body section 20 is slipped between the stroller operator handle 31 and the back of the carrier section 14. The body section 20, including the two body panels 35A and 35B, is extended beneath the carrier section 14 until strap 30 is aligned with the child restraint member 18. At this point neither strap 30 nor 34 is attached to the restraint member 18.

The top end 19 of restraint member 18 is unsnapped at snaps 27 or otherwise released. The restraint member 18 is then passed through the loop of strap 30 and then through the loop of strap 34. The restraint member is then refastened by engaging snaps 27. The fabric shading panel is then closed around the carrier 14 by engaging complementary fasteners 38a with 40a and complementary fasteners 38b with 40b.

The split 35 in the body section 20 affords the user greater flexibility in conforming the body section to the various configurations of strollers. Some strollers have a large basket on the bottom of the stroller frame and the split 35 in body 20 allows the user to move the right and left panels 35A and 35B so as to avoid any obstacle (such as the basket) underneath the carrier section of the stroller.

When the user positions the carrier 14 in a reclining position, the carrier back is lowered from a generally vertical configuration to a horizontal configuration. The present shade 10 continues to depend downwardly from the canopy 16 and provide adequate protection of the infant. This is because the straps 30 and 34 are elastic and cooperate with adjustments to the hook and loop fasteners to ensure full enclosure of the carrier section in the reclined position.

Use of the present invention 10 with a foldable, umbrella stroller 11A having a canopy 16A is shown in FIG. 6. With the umbrella stroller 11A, the child is retained in the seat or carrier section by a belt-like strap 18A having a loop 19A on its upper end. A flexible seat belt 21A extends from both sides of the carrier section 14A in a fashion well-known in the art. (Belt 21A is functionally equivalent to the horizontal support bar 21 of the conventional stroller 11.) By passing the belt 21A through the loop 19A the child is retained in the stroller 11A similar to the way he or she is retained in the stroller 11 of FIGS. 1 and 5.

As previously discussed, strap 36 is engaged with the restraint member 18A and the lower end 28 of body section 20 is folded between the seat and the body section. This allows the same combined supplemental shade and carrier apparatus 10 to be used with several different styles of canopied strollers.

It should also be noted in FIG. 6 that the shading panel 32 may be arranged so as to be only partially closed. FIG. 6 shows the left side of the shading panel 32 drawn open by attaching fastener section 38b across the top of the canopy 16A to engagement with complementary fastener 42a. Fasteners 38a and 40a are engaged at the rear of the stroller providing for closure of the left side of the shading panel. In this arrangement of FIG. 6, one side of the shade may be open while the other side is closed.

One of ordinary skill in the art will be able to readily understand the way to attach the apparatus 10 to the stroller 11A of FIG. 6, by reference to the above description for FIGS. 1 and 5.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A shade for a stroller, said stroller having a frame for supporting a child in a carrier section, an overhanging canopy member, and a child restraint member attached to said frame, said shade comprising:

a first flexible fabric body section having an inner surface and an outer surface and a first end and a second end;

a first means for releasably attaching said body section at said second end to said child restraint member, said first releasable attachment means affixed to said inner surface of said body section;

a fabric shading panel attached at said first end of said body section and along an upper length of said body section, said panel having a means for releasably attaching said panel to said child restraint means, wherein said inner surface at said first end of said body section is adapted to overlay said canopy and said inner surface at said second end of said body section is adapted to underlay said carrier section when said first releasable attachment means and said second releasable attachment means are attached to said child restraint member.

2. The shade of claim 1 further comprising:

a third alternative means for releasably attaching said body section at said second end to said child restraint means, said third alternative attachment means affixed to said outer surface of said body section at said second end.

3. The shade of claim 1 further comprising:

a first section of a means for fastening said panel to said body section, said first section affixed to an outer edge of said panel along a reinforcing band extending around an outer perimeter of said panel; and a second section of said means for fastening said panel to said body section, said second section affixed to an outer edge of said outer surface of said body section, said first section and said second section cooperating to secure said shading panel in a closed condition about said carrier section of said stroller.

4. The shade of claim 3 wherein said first section further comprises:

a left element affixed to a left outer edge of said panel, and a right element affixed to a right outer edge of said panel, and said second section further comprises:

a complementary left element affixed to a left outer edge of said body section and a complementary right element affixed to a right outer edge of said body section, said left element and said complementary left element cooperating to secure a left side of said shading panel in a closed condition, and said right element and said complementary right element cooperating to secure a right side of said shading panel in a closed condition.

5. The shade of claim 4 further comprising:

a means for securing said shade panel in an open condition atop said canopy.

6. The shade of claim 5 when said means for securing said shade panel in said open condition comprises:

left and right fastener sections affixed to an outer left and an outer right edge, respectively, of said outer surface of said body section at said first end, said left and right fastener sections cooperating with said left element and said right element, respectively, to secure a left side and a right side section, respectively, of said shade panel in said open condition.

7. The shade of claim 1 further comprising:

a closeable pocket formed along said outer surface of said body portion, said pocket accessible from a rear side of said stroller when said first and second releasable attachment means are attached to said child restraint means.

8. The shade of claim 1 wherein said fabric shading panel is composed of ultraviolet radiation screening material capable of blocking 50%–75% of the ambient ultraviolet radiation.

9. The shade of claim 1 further comprising a means for securing said shade in a closely rolled, soft carrying condition.

10. The shade of claim 1 wherein said first flexible fabric body section further has a left panel section and a right panel section, said panel sections separated by a split in said body section extending from a midsection of said body section to said second end of said body section.

11. The shade of claim 1 wherein said fabric shading panel extends downwardly from said canopy member to a location approximately horizontal with said child restraint member and above a seat portion of said carrier section when operatively secured to said stroller.

* * * * *